(12) United States Patent
Taniai

(10) Patent No.: US 7,644,638 B2
(45) Date of Patent: Jan. 12, 2010

(54) AUTOMATIC TRANSMISSION

(75) Inventor: Kazuhiro Taniai, Kokubunji (JP)

(73) Assignee: Nissan Motor Co., Ltd., Yokohama (JP)

( * ) Notice: Subject to any disclaimer, the term of this patent is extended or adjusted under 35 U.S.C. 154(b) by 512 days.

(21) Appl. No.: 11/710,923

(22) Filed: Feb. 27, 2007

(65) Prior Publication Data

US 2007/0199396 A1    Aug. 30, 2007

(30) Foreign Application Priority Data

Feb. 28, 2006  (JP) .............................. 2006-051902
Nov. 24, 2006  (JP) .............................. 2006-317449

(51) Int. Cl.
*F16H 57/02* (2006.01)
(52) U.S. Cl. .......................... 74/335; 74/330
(58) Field of Classification Search .................... 74/340
See application file for complete search history.

(56) References Cited

U.S. PATENT DOCUMENTS 6,086,506 A * 7/2000 Petersmann et al. ........... 477/45

2002/0148310 A1 * 10/2002 Uchino ......................... 74/335
2005/0229732 A1 * 10/2005 Hara ............................ 74/325
2007/0068297 A1 * 3/2007 Hori et al. .................... 74/335

FOREIGN PATENT DOCUMENTS

| JP | S60-252850 | 12/1985 |
| JP | H06-229463 | 8/1994 |
| JP | 2002-29530 | 1/2002 |
| JP | 2003-56668 | 2/2003 |

* cited by examiner

*Primary Examiner*—Sherry L Estremsky
*Assistant Examiner*—Edwin A. Young
(74) *Attorney, Agent, or Firm*—Global IP Counselors, LLP

(57) ABSTRACT

An automatic transmission has a clutch mechanism, an oil pump, and a valve body that encloses a clutch hydraulic pressure control mechanism. The valve body is arranged axially adjacent to the clutch mechanism. The oil pump is offset from an input shaft of the transmission and arranged so as to overlap the valve body and/or the clutch mechanism when viewed from a direction perpendicular to the axial direction of the automatic transmission. This automatic transmission improves the control response of the clutch of the transmission while avoiding an increase in the size of the transmission.

18 Claims, 5 Drawing Sheets

AUTOMATIC TRANSMISSION

CROSS-REFERENCE TO RELATED APPLICATIONS

This application claims priority to Japanese Patent Application Nos. 2006-051902, filed on Feb. 28, 2006, and 2006-317449, filed on Nov. 24, 2006. The entire disclosures of Japanese Patent Application Nos. 2006-051902 and 2006-317449 are hereby incorporated herein by reference.

BACKGROUND OF THE INVENTION

1. Field of the Invention

The present invention generally relates to automatic transmissions. More specifically, the present invention relates to an automatic transmission having a hydraulic pressure control valve serving to produce a hydraulic pressure for controlling a gear changing element configured to control a gear ratio by hydraulic operation, with the hydraulic pressure control valve being housed inside a transmission case.

2. Background Information

In conventional automatic transmissions, a main transmission and an auxiliary transmission and a valve body are provided. The valve body houses a plurality of hydraulic pressure control valves that are provided for adjusting control hydraulic pressures supplied to a clutch and other components that operate hydraulically when the transmission changes gears. In some of these conventional automatic transmissions (e.g., Japanese Laid-Open Patent Publication No. 06-229463), the valve body is divided into a valve body for the main transmission and a valve body for the auxiliary transmission. The valve body for the main transmission is arranged near the main transmission, while the valve body for the auxiliary transmission is arranged near the auxiliary transmission. Thus, in this conventional automatic transmission, the valve body is divided and arranged near the clutch. Other examples of conventional automatic transmissions are disclosed in Japanese Laid-Open Patent Publication No. 2003-56668, Japanese Laid-Open Patent Publication No. 2002-29530 and Japanese Laid-Open Patent Publication No. 60-252850.

In view of the above conventional technology, it will be apparent to those skilled in the art from this disclosure that there exists a need for an improved automatic transmission. This invention addresses this need in the art as well as other needs, which will become apparent to those skilled in the art from this disclosure.

SUMMARY OF THE INVENTION

It has been discovered that in conventional auxiliary transmissions having a divided valve body as just described, the valve body for the auxiliary transmission is arranged so as to overlap with an upper position of the auxiliary transmission when viewed from a direction perpendicular to an axial direction of the transmission. Consequently, the dimension (size) of the transmission in this direction perpendicular to the axial direction is larger than it might be. Thus, the overall size of the transmission is larger.

The present invention was conceived in view of this problem. One object of the present invention is to provide an automatic transmission that avoids an increase in size that results from the conventional arrangement of the control valve for the auxiliary transmission.

In order to achieve the aforementioned object of the present invention, an automatic transmission is provided in accordance with a first aspect of the present invention that basically comprises an input shaft, a gear-speed changing mechanism, a clutch mechanism, a clutch hydraulic pressure control mechanism, a valve body and an oil pump. The input shaft is configured and arranged to receive a rotational drive torque from a drive source. The gear-speed changing mechanism is configured to produce a gear ratio and operatively arranged to receive the rotational torque from the drive source. The clutch mechanism is arranged coaxially with respect to the input shaft and configured to be hydraulically connected and disconnected to the rotational drive torque from the drive source to the gear-speed changing mechanism. The clutch hydraulic pressure control mechanism is configured to control hydraulic pressure the clutch mechanism. The valve body is arranged axially adjacent to the clutch mechanism and enclosing the clutch hydraulic pressure control mechanism. The oil pump is configured and arranged to supply hydraulic pressure to the clutch hydraulic pressure control mechanism. The oil pump is further arranged so as to be offset from the input shaft and to overlap at least one of the clutch mechanism and the valve body when viewed along a direction perpendicular to an axial direction of the input shaft.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
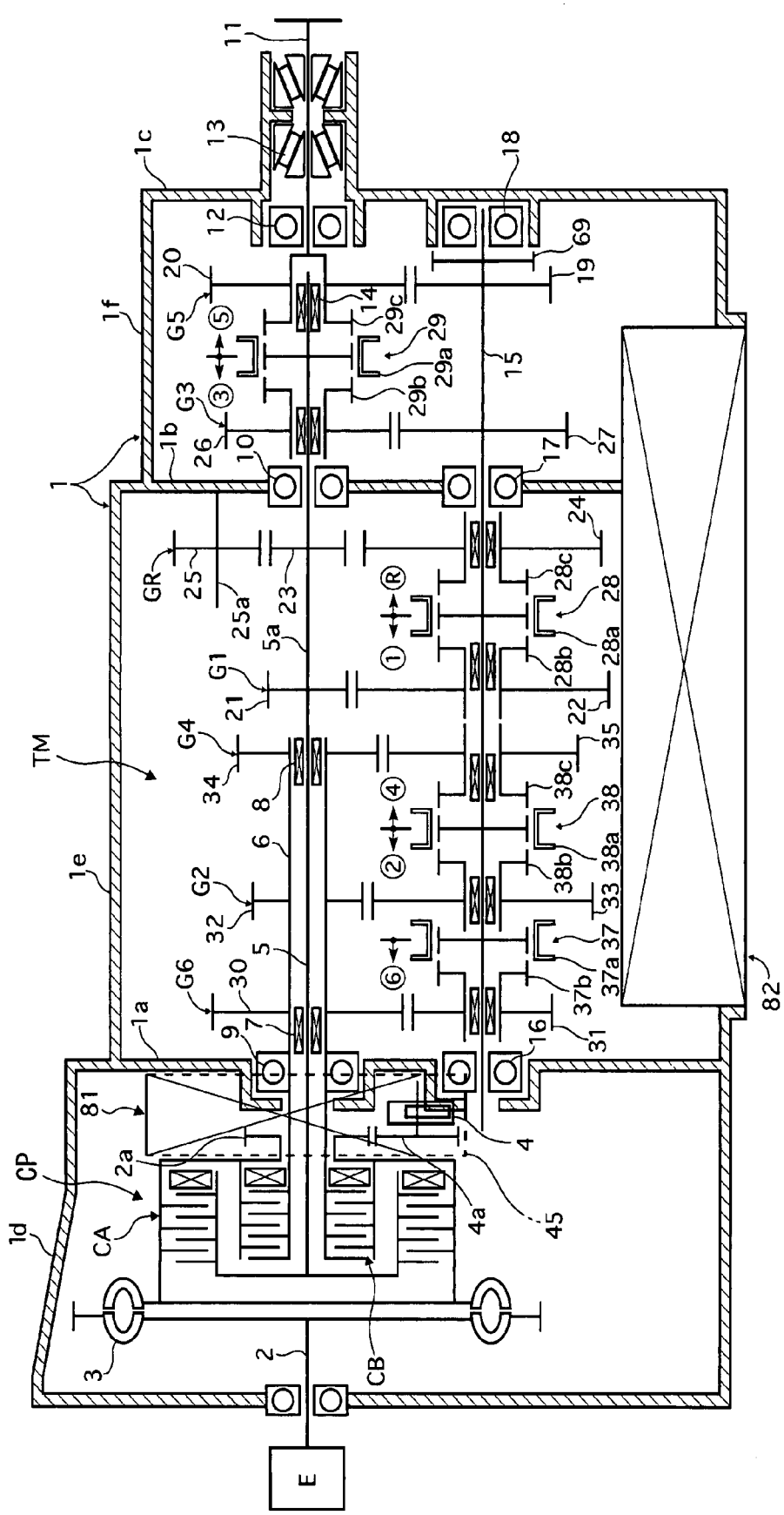
FIG. 1 simplified schematic cross sectional view (skeleton diagram) of a twin-clutch automatic manual transmission (exemplifying an automatic clutch) in accordance with a first embodiment of the present invention.

Referring initially to FIG. 1, an automatic transmission is illustrated in accordance with a first embodiment of the present invention. FIG. 1 is simplified schematic cross sectional view (skeleton diagram) of the twin-clutch automatic manual transmission (exemplifying an automatic clutch) in accordance with the first embodiment. First, the input section and the shafts of a twin-clutch automatic manual transmission in accordance with the first embodiment of the present invention will now be explained.

As shown in FIG. 1, the twin-clutch automatic manual transmission includes a clutch mechanism or clutch pack CP that includes a first clutch CA and a second clutch CB that are arranged in the input section of the twin-clutch automatic manual transmission in accordance with the first embodiment of the present invention. The first clutch CA is connected when an odd numbered speed gear group is selected from among a plurality of speed gears, while the second clutch CB is connected when an even numbered speed gear group is selected from among a plurality of speed gears. The automatic manual transmission also includes a transmission case 1, a drive input shaft 2, a torsional damper 3, an oil pump 4, a first transmission input shaft 5, and a second transmission input shaft 6. The first and second clutches CA and CB constitute a clutch mechanism that is arranged coaxially with respect to the drive input shaft 2 that receives power inputted to a gear-speed changing mechanism TM from a drive source such as an engine E. The first and second clutches CA and CB are configured to be hydraulically connected and disconnected to transfer power from the drive source (engine E) to the gear-speed changing mechanism TM. With the automatic transmission in accordance with the present invention, as explained below, the axial dimension of the automatic transmission can be suppressed while also preventing the automatic transmission from being large in a direction perpendicular to the axial direction when the control valve for controlling the clutch mechanism or clutch pack CP is arranged close to the clutch mechanism or clutch pack CP in order to improve the control response of the clutch mechanism or clutch pack CP.

The first clutch CA is for odd numbered speed gears (first forward gear, third forward gear, fifth forward gear, and reverse gear) and the second clutch CB is for even numbered speed gears (second forward gear, fourth forward gear, and sixth forward gear). The drive sides of both of the clutches CA and CB are connected to the drive input shaft 2 through the torsional damper 3. The drive shaft 2 receives a rotational drive torque from the engine E or other drive source. When an odd numbered speed gear is selected, the first clutch CA is connected or engaged such that the rotational drive torque of the engine E or other drive source is transferred to the first transmission input shaft 5. When an even numbered speed gear is selected, the second clutch CB is connected or engaged such that the rotational drive torque of the engine E or other drive source is transferred to the second transmission input shaft 6.

The oil pump 4 is normally driven by the engine E. The oil discharged from the oil pump 4 is used as the hydraulic pressure for controlling the connection and release of the clutches CA and CB and for controlling the gear selection operation of the shift actuator. The excess oil is supplied as lubricating oil to places where lubrication is necessary.

The second transmission input shaft 6 is a hollow shaft, while the first transmission input shaft 5 is a solid shaft that is partially disposed within the second transmission input shaft 6. The second transmission input shaft 6 is supported by a front needle bearing 7 and a rear needle bearing 8 such that it is coaxial and can rotate freely with respect to the first transmission input shaft 5. The second transmission input shaft 6 is also supported by a ball bearing 9 such that it can rotate freely with respect to a front end wall 1a of the transmission case 1. The first transmission input shaft 5 protrudes from the rearward end of the second transmission input shaft 6. The protruding rearward end portion 5a of the first transmission input shaft 5 passes through an intermediate wall 1b of the transmission case 1 and is supported by a ball bearing 10 such that it can rotate freely with respect to the intermediate wall 1b.

A transmission output shaft 11 is arranged coaxially at the rearward end 5a of the first transmission input shaft 5. The transmission output shaft 11 is rotatably supported on a rear end wall 1c of the transmission case 1 by a tapered roller bearing 12 and an axial bearing 13 and supported on the rearward end 5a of the first transmission input shaft 5 with a needle bearing 14.

A countershaft 15 is arranged parallel to the first transmission input shaft 5, the second transmission input shaft 6, and the transmission output shaft 11. The countershaft 15 is rotatably supported on the front end wall 1a, the intermediate wall 1b, and the rear end wall 1c of the transmission case 1 by roller bearings 16, 17, and 18, respectively.

The gear-speed changing mechanism TM of the twin-clutch automatic manual transmission in accordance with the first embodiment will now be explained. As shown in FIG. 1, the gear-speed changing mechanism TM of the twin-clutch automatic manual transmission in accordance with the first embodiment comprises a normally-meshed gear train having a synchromesh mechanism and configured to achieve a six forward gears (speeds) and one reverse gear with a plurality of gear pairs having different tooth count ratios. The gear-speed changing mechanism TM basically includes a first speed gearwheel set G1, a second speed gearwheel set G2, a third speed gearwheel set G3, a fourth speed gearwheel set G4, a fifth speed gearwheel set G5, a sixth speed gearwheel set G6 and a reverse gearwheel set GR. The fifth speed gearwheel set G5 includes a counter gearwheel 19 and an output gearwheel 20. The counter gearwheel 19 is fixed on the rearward end of the countershaft 15, while the output gearwheel 20 is provided on the transmission output shaft 11. A park gear 69 is also fixed on the rearward end of the countershaft 15 adjacent to the counter gearwheel 19. The counter gearwheel 19 and the output gearwheel 20 are meshed together such that the countershaft 15 drives the transmission output shaft 11 when the output gearwheel 20 is connected to rotate with the transmission output shaft 11. The counter gearwheel 19 and the output gearwheel 20 also constitute the gearwheel set G5 for obtaining a fifth forward gear (fifth speed).

The gearwheel sets of the odd numbered speed gears (first speed, third speed, and reverse) are arranged between the rearward end portion 5a of the first transmission input shaft 5 and the countershaft 15 such that the first speed gearwheel set G1 is located the closest toward the front of the transmission, the reverse gearwheel set GR is located farther toward the rear of the transmission, and the third speed gearwheel set G3 is located still farther toward the rear of the transmission.

The first speed gearwheel set G1 comprises a first speed input gearwheel 21 provided on rearward end portion 5a of the first transmission input shaft 5 and a first speed output gearwheel 22 provided on the countershaft 15, with the gearwheels 21 and 22 being arranged so as to be intermeshed with each other.

The reverse gearwheel set GR comprises a reverse input gearwheel 23 provided on the rearward end portion 5a of the first transmission input shaft 5, a reverse output gearwheel 24 provided on the countershaft 15, and a reverse idler gearwheel 25 that meshes with both of the gearwheels 23 and 24. The reverse idler gearwheel 25 is rotatably supported on a reverse idler shaft 25 that is provided so as to protrude from the intermediate wall 1b of the transmission case 1.

The third speed gearwheel set G3 comprises a third speed input gearwheel 26 provided on rearward end portion 5a of the first transmission input shaft 5 and a third speed output gearwheel 27 provided on the countershaft 15, with the gearwheels 26 and 27 being arranged so as to be intermeshed with each other.

A 1-R synchromesh mechanism 28 is provided on the countershaft 15 between the first speed gearwheel set G1 and the reverse gearwheel set GR. The 1-R synchromesh mechanism 28 has a coupling sleeve 28a that is axially movable to selectively connect either the first speed output gearwheel 22 to the countershaft 15 or the reverse output gearwheel 24 to the countershaft 15. When the coupling sleeve 28a is moved leftward from the neutral position shown in FIG. 1 until a spline engagement is achieved with a clutch gear 28b, the first speed output gearwheel 22 is then coupled to the countershaft 15 such that it can drive the countershaft 15 and the first speed can be selected. When the coupling sleeve 28a is moved rightward from the neutral position shown in FIG. 24 until a spline engagement is achieved with a clutch gear 28c, the reverse output gearwheel 24 is then coupled to the countershaft 15 such that it can drive the countershaft 15 and a reverse gear can be selected.

A 3-5 synchromesh mechanism 29 is provided on the rearward end portion 5a of the first transmission input shaft 5 between the third speed gearwheel set G3 and the output gearwheel 20. The 3-5 synchromesh mechanism 29 has a coupling sleeve 29a that is axially movable to selectively connect either the third speed input gearwheel 26 to the first transmission input shaft 5 or the output gearwheel 20 to the first transmission input shaft 5. When the coupling sleeve 29a is moved leftward from the neutral position shown in FIG. 1 until a spline engagement is achieved with a clutch gear 29b, the third speed input gearwheel 26 is then coupled to the first transmission input shaft 5 such that it can drive the first transmission input shaft 5 and the third speed can be selected. When the coupling sleeve 29a is moved rightward from the neutral position shown in FIG. 1 until a spline engagement is achieved with a clutch gear 29c, the output gearwheel 20 is then coupled to the first transmission input shaft 5 such that it can drive the first transmission input shaft 5 and the fifth speed can be selected.

The gearwheel sets of the even numbered speeds (second speed, fourth speed, and sixth speed) are arranged between the second transmission input shaft 6 and the countershaft 15 such that the sixth speed gearwheel set G6 is located the closest toward the front of the transmission, the second speed gearwheel set G2 is located farther toward the rear, and the fourth speed gear G4 set is located still farther toward the rear.

The sixth speed gear pair G6 comprises a sixth speed input gearwheel 30 provided on the second transmission input shaft 6 and a sixth speed output gearwheel 31 provided on the countershaft 15, the gearwheels 30 and 31 being arranged so as to be intermeshed with each other.

The second speed gear pair G2 comprises a second speed input gearwheel 32 provided on the second transmission input shaft 6 and a sixth speed output gearwheel 33 provided on the countershaft 15, the gearwheels 32 and 33 being arranged so as to be intermeshed with each other.

The fourth speed gear pair G4 comprises a fourth speed input gearwheel 34 provided on the second transmission input shaft 6 and a fourth speed output gearwheel 35 provided on the countershaft 15, the gearwheels 34 and 35 being arranged so as to be intermeshed with each other.

A 6-N synchromesh mechanism 37 is provided on the countershaft 15 beside the sixth speed gearwheel set G6. The 6-N synchromesh mechanism 37 has a coupling sleeve 37a that is axially movable to selectively connect the sixth speed output gearwheel 31 to the countershaft 15. When the coupling sleeve 37a is moved leftward from the neutral position shown in FIG. 1 until a spline engagement is achieved with a clutch gear 37b, the sixth speed output gearwheel 31 is then coupled to the countershaft 15 such that it can drive the countershaft 15 and the sixth speed can be selected.

A 2-4 synchromesh mechanism 38 is provided on the countershaft 15 between the second speed gearwheel set G2 and the fourth speed gearwheel set G4. The 2-4 synchromesh mechanism 38 has a coupling sleeve 38a that is axially movable to selectively connect either the second speed output gearwheel 33 to the countershaft 15 or the fourth speed output gearwheel 35 to the countershaft 15. When the coupling sleeve 38a of the 2-4 synchromesh mechanism 38 is moved leftward from the neutral position shown in FIG. 2 until a spline engagement is achieved with a clutch gear 38b, the second speed output gearwheel 33 is coupled to the countershaft 15 such that it can drive the countershaft 15 and the second speed can be selected. Meanwhile, when the coupling sleeve 38a of the 2-4 synchromesh mechanism 38 is moved rightward from the neutral position shown in FIG. 4 until a spline engagement is achieved with a clutch gear 38c, the fourth speed output gearwheel 35 is then coupled to the countershaft 15 such that it can drive the countershaft 15 and the fourth speed can be selected.

Figure 2:
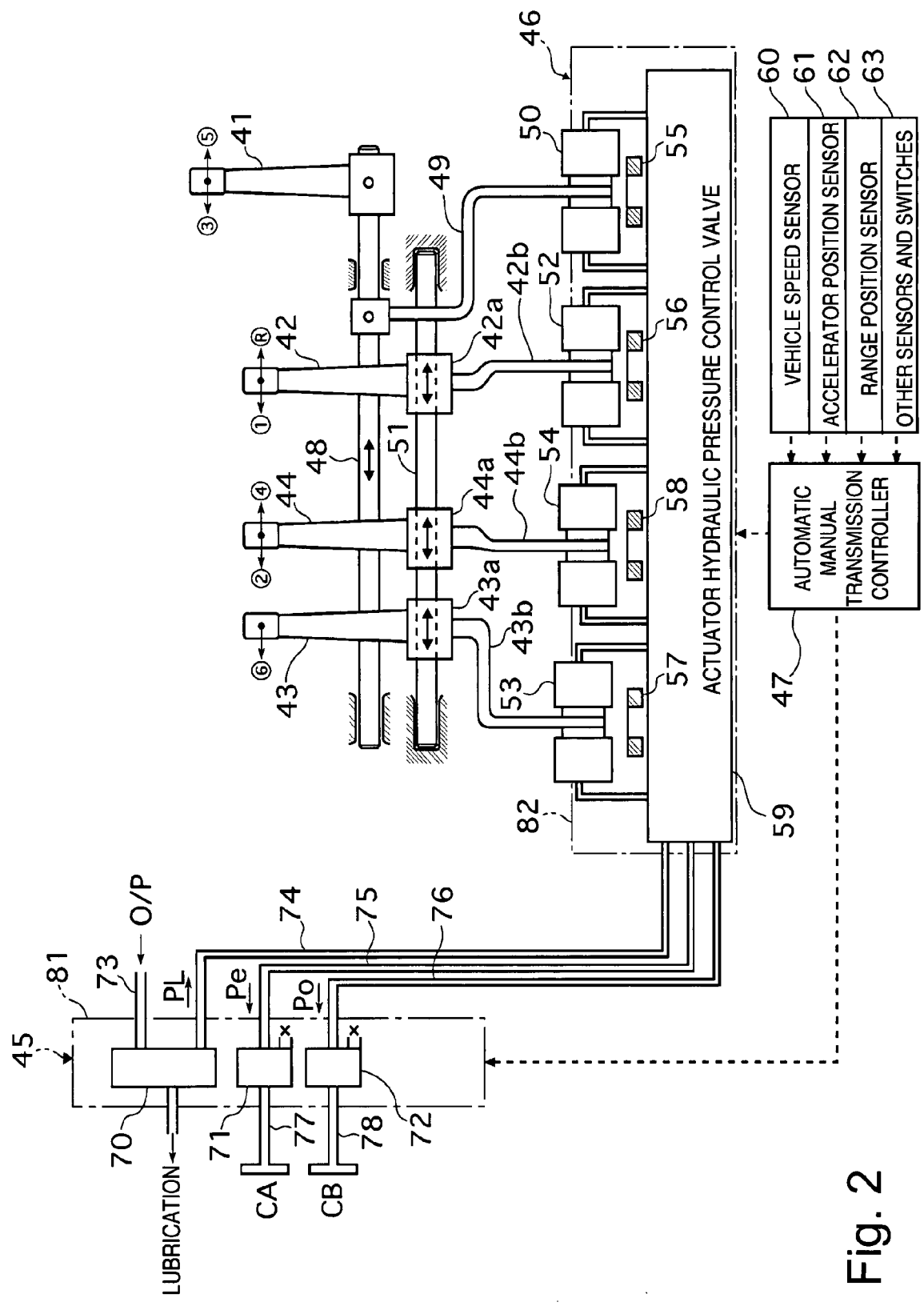
FIG. 2 is a hydraulic/electronic control system diagram showing the gear changing hydraulic control system and electronic control system of the twin-clutch automatic manual transmission in accordance with the first embodiment of the present invention.

FIG. 2 is a control system diagram showing the gear changing hydraulic control system and electronic control system of a twin-clutch automatic manual transmission in accordance with the first embodiment.

As shown in FIG. 2, the gear changing hydraulic control system and electronic control system of the twin-clutch automatic manual transmission in accordance with the first embodiment include a 3-5 shift fork 41, a 1-R shift fork 42, 6-N shift fork 43, a 2-4 shift fork 44, a first control valve unit 45, a second control valve unit 46, and an automatic manual transmission controller 47.

The 3-5 shift fork 41 engages with the coupling sleeve 29a of the 3-5 synchromesh mechanism 29 and is fixed to a first shift rod 48. The first shift rod 48 is supported by the frontward end wall 1a and the intermediate wall 1b of the transmission case 1 in such a manner that it can move in the axial direction. A 3-5 shift bracket 49 is fixed to the first shift rod 48 and an end part of the 3-5 shift bracket 49 is loosely mounted to a spool coupling shaft of a 3-5 shift actuator 50. Thus, the 3-5 shift fork 41 is moved to the left (when third speed is selected) or right (when fifth speed is selected) from the neutral position shown in FIG. 2 in accordance with the spool operation of the 3-5 shift actuator 50.

The 1-R shift fork 42 engages with the coupling sleeve 28a of the 1-R synchromesh mechanism 28 and is arranged on a second shift rod 51 in such a manner that it can be moved along the axial direction. The second shift rod 51 is supported by the frontward end wall 1a and the intermediate wall 1b of the transmission case 1 in such a manner that it cannot move (is fixed) in the axial direction. The 1-R shift fork 42 has a bracket cylinder part 42a and a bracket arm part 42b that are formed as an integral unit. An end part of the bracket arm part 42b is loosely mounted to a spool coupling shaft of a 1-R shift actuator 52. Thus, the 1-R shift fork 42 is moved to the left (when first speed is selected) or right (when reverse is selected) from the neutral position shown in FIG. 2 in accordance with the spool operation of the 1-R shift actuator 52.

The 6-N shift fork 43 engages with the coupling sleeve 37a of the 6-N synchromesh mechanism 37 and is arranged on the second shift rod 51 (which is fixed with respect to the transmission case 1 in the axial direction) in such a manner that it can be moved along the axial direction. The 6-N shift fork 43 has a bracket cylinder part 43a and a bracket arm part 43b that are formed as an integral unit. An end part of the bracket arm part 43b is loosely mounted to a spool coupling shaft of a 6-N shift actuator 53. Thus, the 6-N shift fork 43 is moved to the left (when sixth speed is selected) from the neutral position shown in FIG. 2 in accordance with the spool operation of the 6-N shift actuator 53.

The 2-4 shift fork 44 engages with the coupling sleeve 38a of the 2-4 synchromesh mechanism 38 and is arranged on the second shift rod 51 (which is fixed with respect to the transmission case 1 in the axial direction) in such a manner that it can be moved along the axial direction. The 2-4 shift fork 44 has a bracket cylinder part 44a and a bracket arm part 44b that are formed as an integral unit. An end part of the bracket arm part 44b is loosely mounted to a spool coupling shaft of a 2-4 shift actuator 54. Thus, the 2-4 shift fork 44 is moved to the left (when second speed is selected) or right (when fourth speed is selected) from the neutral position shown in FIG. 2 in accordance with the spool operation of the 2-4 shift actuator 54.

As shown in FIG. 2, the first control valve unit 45 comprises a line pressure solenoid valve 70, a first clutch pressure solenoid valve 71, and a second clutch pressure solenoid valve 72 arranged inside a first valve body 81. The line pressure solenoid valve 70 serves to adjust the line pressure PL based on the discharge oil from the oil pump 4. The first clutch pressure solenoid valve 71 serves to produce a clutch control pressure for the first clutch CA based on an even numbered speed gear pressure Pe from an actuator hydraulic pressure control valve 59 configured to produce an actuator operating pressure for the shift actuators 50, 52, 53 and 54. The second clutch pressure solenoid valve 72 serves to produce a clutch control pressure for the second clutch CB based on an odd numbered speed gear pressure Po.

The line pressure solenoid valve 70, the first clutch pressure solenoid valve 71, and the second clutch pressure solenoid valve 72 constitute a "clutch hydraulic pressure control mechanism" that controls the hydraulic pressure to connect and disconnect the first and second clutches CA and CB.

The oil pump 4 and the line pressure solenoid valve 70 are connected by a pump hydraulic oil passage 73.

The line pressure solenoid valve 70 and the actuator hydraulic pressure control valve 59 are connected by a line hydraulic oil passage 74.

The first clutch pressure solenoid valve 71 and the actuator hydraulic pressure control valve 59 are connected by an even numbered speed gear hydraulic oil passage 75.

The second clutch pressure solenoid valve 72 and the actuator hydraulic pressure control valve 59 are connected by an odd numbered speed gear hydraulic oil passage 76.

The first clutch pressure solenoid valve 71 and the clutch oil chamber of the first clutch CA are connected by a first clutch hydraulic oil passage 77. A first pressure sensor (not shown) is provided in the first clutch hydraulic oil passage 77.

The second clutch pressure solenoid valve 72 and the clutch oil chamber of the second clutch CB are connected by a second clutch hydraulic oil passage 78. A second pressure sensor (not shown) is provided in the second clutch hydraulic oil passage 78.

As shown in FIG. 2, the second control valve unit 46 comprises the 3-5 shift actuator 50, the 1-R shift actuator 52, the 6-N shift actuator 53, the 2-4 shift actuator 54, a 3-5 shift position sensor 55, a 1-R shift position sensor 56, a 6-N shift position sensor 57, a 2-4 shift position sensor 58, and an actuator hydraulic pressure control valve 59 (shift control valve) housed in a second valve body 82 as a single integral unit.

The actuator hydraulic pressure control valve 59 produces an even numbered speed gear pressure Pe and an odd numbered speed gear pressure Po based on the line pressure PL adjusted by the first control valve unit 45. The actuator hydraulic pressure control valve 59 also supplies an actuator operating pressure to the respective gear change hydraulic oil passages leading to the shift actuators 50, 52, 53 and 54 in accordance with the selected gear (speed).

The automatic manual transmission controller 47 receives information from a vehicle speed sensor 60, an accelerator pedal position sensor 61, a range position sensor 62, and other sensors and switches 63 and issues clutch connection control commands (including line pressure control commands) to the valve solenoids of the first control valve unit 45. The automatic manual transmission controller 47 also sends speed selection control commands to the valve solenoids of the actuator hydraulic pressure control valve 59.

The arrangement of the first control valve unit 45 and the second control valve unit 46, which is the distinctive feature the first embodiment, will now be described.

The first embodiment is a twin-clutch automatic manual transmission provided with a hydraulic control valve configured to produce a control hydraulic pressure for controlling a gear changing element that is configured to be operated hydraulically in order to change gears. As shown in FIGS. 1 and 2, in the first embodiment, the clutch control valves 70, 71 and 72 that serve to control the two clutches CA and CB provided in the input section of the transmission are deliberately selected from among all of the hydraulic pressure control valves to be arranged near the clutches CA and CB.

As shown in FIG. 1, the clutch control valves 70, 71 and 72 are arranged beside the clutches CA and CB provided in the input section of the transmission in a position at least the same height as the clutches CA and CB.

The valve body of the hydraulic pressure control valves is divided into a first valve body 81 housing the clutch control valves 70, 71 and 72 and a second valve body 82 housing the actuator hydraulic pressure control valve 59 that controls the gear ratio of the gear-speed changing mechanism TM. The clutch control valves 70, 71 and 72 and the first valve body 81 constitute the first control valve unit 45, and the actuator hydraulic pressure control valve 59 and the second valve body 82 constitute the second control valve unit 46. The first control valve unit 45 and the second control valve unit 46 are arranged in different positions of the transmission case 1.

As shown in FIG. 1, the transmission case 1 is divided into a clutch case section 1d that houses the oil pump 4 and both clutches CA and CB provided in the input section of the transmission and first and second gear-speed changing mechanism case sections 1e and 1f that house the gear train. The first control valve unit 45 is arranged in a side position of the clutch case section 1d and the second control valve unit 46 is arranged in a bottom position of both gear change mechanism case sections 1e and 1f.

The operation of the transmission will now be explained.

A manual transmission has the advantages of being efficient and structurally simple but it requires the driver to perform all gear changing operations. An automatic manual transmission is a transmission that retains the advantages of the manual transmission while incorporating a mechanism to automate the gear changing operations.

One problem with an automatic manual transmission is the fact that a clutch is disengaged temporarily in order to execute a change of gears and the resulting interruption of torque occurring during automated gear changing feels odd to a driver. In order to solve this problem, the torque interruption needs to be eliminated. A normal manual transmission has one clutch set. One way to eliminate the interruption of torque during gear changing is to add one more clutch set and connect and disconnect the two clutches in a coordinated manner, i.e., reverse which of the two clutches is engaged. An automatic manual transmission using two clutches in this manner is called a "twin-clutch automatic manual transmission."

When shifting between adjacent gears in a twin-clutch automatic manual transmission in accordance with the first embodiment, first, before the clutch engagement reversal control is executed, the next speed gear is selected from among the group of speed gears whose clutch is released and the actuator hydraulic pressure control valve 59 is operated so as to produce a gear changing hydraulic pressure at the shift actuator corresponding to the selected speed gear. More specifically, the gear changing hydraulic pressure causes the shift actuator to move the corresponding shift fork in such a direction as to obtain the selected gear. Then, the clutch control valves 70, 71 and 72 are controlled so as to produce hydraulic pressures that cause the engagement states of the first clutch CA and the second clutch CB to be reversed (i.e., whichever clutch was connected is disconnected and whichever clutch was disconnected is connected). As a result, the gear change operation is completed without interrupting the torque. The gear change operation of a twin-clutch automatic manual transmission in accordance with the first embodiment will now be explained.

When the neutral position (N range) or the park position (P range) is selected, both clutches CA and CB are released and the shift actuators 50, 52, 53 and 54 are all set to the neutral positions shown in FIG. 2. In other words, the coupling sleeves 28a, 29a, 37a and 38a of the synchromesh mechanisms 28, 29, 37 and 38 are all kept in the neutral position such that the twin-clutch automatic manual transmission does not transfer power.

When the D range, the R range, or another range requiring the transfer of power is selected and when manual mode (mode in which the driver shifts gears manually) is selected, gear changing is executed basically according to the following procedure.

When first speed is selected, the 1-R shift actuator 52 is controlled such that it operates leftward from the perspective of FIG. 2. Thus, the coupling sleeve 28a of the synchromesh mechanism 28 is moved leftward from the perspective of FIG. 2 such that the gearwheel 22 is coupled to the countershaft 15 in such a manner that it can drive the countershaft 15. Afterwards, the first clutch CA is connected. As a result, the drive input is transferred from the first clutch CA to the transmission output shaft 11 through the following components in order as listed so as to achieve power transfer in accordance with the first speed: first transmission input shaft 5→first speed gearwheel set G1→countershaft 15→output gearwheel set 19 and 20→transmission output shaft 11.

When the transmission upshifts from first speed to second speed, the 2-4 shift actuator 54 is controlled such that it operates leftward from the perspective of FIG. 2. Thus, the coupling sleeve 38a of the synchromesh mechanism 38 is moved leftward from the perspective of FIG. 2 such that the gearwheel 33 is coupled to the countershaft 15 in such a manner that it can drive the countershaft 15. Afterwards, the first clutch CA is released and the second clutch CB is connected (clutch engagement reversal) such that the transmission upshifts from first speed to second speed. As a result, the drive input is transferred from the second clutch CB to the transmission output shaft 11 through the following components in order as listed so as to achieve power transfer in accordance with the second speed: second transmission input shaft 6→second speed gearwheel set G2→countershaft 15→output gearwheel set 19 and 20→transmission output shaft 11.

When the transmission upshifts from second speed to third speed, the 3-5 shift actuator 50 is controlled such that it operates leftward from the perspective of FIG. 2. Thus, the coupling sleeve 29a of the synchromesh mechanism 29 is moved leftward from the perspective of FIG. 2 such that the gearwheel 26 is coupled to the first transmission input shaft 5 in such a manner that it can drive the first transmission input shaft 5. Afterwards, the second clutch CB is released and the first clutch CA is connected (clutch engagement reversal) such that the transmission upshifts from second speed to third speed. As a result, the drive input is transferred from the first clutch CA to the transmission output shaft 11 through the following components in order as listed so as to achieve power transfer in accordance with the third speed: first transmission input shaft 5→third speed gearwheel set G3→countershaft 15→output gearwheel set 19 and 20→transmission output shaft 11.

When the transmission upshifts from third speed to fourth speed, the 2-4 shift actuator 54 is controlled such that it operates rightward from the perspective of FIG. 2. Thus, the coupling sleeve 38a of the synchromesh mechanism 38 is moved rightward from the perspective of FIG. 2 such that the gearwheel 35 is coupled to the countershaft 15 in such a manner that it can drive the countershaft 15. Afterwards, the first clutch CA is released and the second clutch CB is connected (clutch engagement reversal) such that the transmission upshifts from third speed to fourth speed. As a result, the drive input is transferred from the second clutch CB to the transmission output shaft 11 through the following components in order as listed so as to achieve power transfer in accordance with the fourth speed: second transmission input shaft 6→fourth speed gearwheel set G4→countershaft 15→output gearwheel set 19 and 20→transmission output shaft 11.

When the transmission upshifts from fourth speed to fifth speed, the 3-5 shift actuator 50 is controlled such that it operates rightward from the perspective of FIG. 2. Thus, the coupling sleeve 29a of the synchromesh mechanism 29 is moved rightward from the perspective of FIG. 2 such that the first transmission input shaft 5 is connected directly to the transmission output shaft 11. Afterwards, the second clutch CB is released and the first clutch CA is connected (clutch engagement reversal) such that the transmission upshifts from fourth speed to fifth speed. As a result, the drive input is transferred from the first clutch CA to the transmission output shaft 11 through the following components in order as listed so as to achieve power transfer in accordance with the fifth speed (gear ratio of 1): first transmission input shaft 5→fifth speed gearwheel set G5→countershaft 15→output gearwheel set 19 and 20→transmission output shaft 11.

When the transmission upshifts from fifth speed to sixth speed, the 6-N shift actuator 53 is controlled such that it operates leftward from the perspective of FIG. 2. Thus, the coupling sleeve 37a of the synchromesh mechanism 37 is moved leftward from the perspective of FIG. 2 such that the gearwheel 31 is coupled to the countershaft 15 in such a manner that it can drive the countershaft 15. Afterwards, the first clutch CA is released and the second clutch CB is connected (clutch engagement reversal) such that the transmission upshifts from fifth speed to sixth speed. As a result, the drive input is transferred from the second clutch CB to the transmission output shaft 11 through the following components in order as listed so as to achieve power transfer in accordance with the sixth speed: second transmission input shaft 6→sixth speed gearwheel set G6→countershaft 15→output gearwheel set 19 and 20→transmission output shaft 11. In order to downshift successively from sixth speed to first speed, the transmission is controlled in the opposite manner as for upshifting.

When the R range is selected, the 1-R shift actuator 52 is controlled such that it moves rightward from the perspective of FIG. 2. Thus, the coupling sleeve 28a of the synchromesh mechanism 28 is moved rightward from the perspective of FIG. 2 such that the gearwheel 24 is coupled to the countershaft 15 in such a manner that it can drive the countershaft 15. Afterwards, the first clutch CA is connected. As a result, the drive input is transferred from the first clutch CA to the transmission output shaft 11 through the following components in order as listed so as to achieve power transfer in accordance with the reverse gear: first transmission input shaft 5→reverse gearwheel set GR→countershaft 15→output gearwheel set 19 and 20→transmission output shaft 11.

The operational effects of the arrangement of the hydraulic pressure control valves in a twin-clutch automatic manual transmission in accordance with the first embodiment will now be explained.

In conventional automatic transmissions (AT, automatic transmissions with step-like shifting) and continuously variable transmissions (CVT), a hydraulic pressure control valve unit serving to produce hydraulic pressures for controlling the hydraulically operated gear changing elements (clutches, brakes, etc.) used to change gears is arranged in a bottom section of the transmission case. Consequently, the hydraulic pressure control valve unit that serves to produce the clutch holding pressure is positioned far away from the clutches. As a result, for example, even if the hydraulic pressure control valve unit produces an appropriate clutch holding pressure with good response in accordance with the operation of the accelerator (torque request) when the accelerator is depressed, the transfer of the holding pressure to the clutch is delayed because of the distance between the hydraulic control valve unit and the clutch and ultimately the control response of the clutch is poor.

Conversely, with the twin-clutch automatic manual transmission in accordance with the first embodiment, the control response of the first clutch CA and the second clutch CB can be improved while ensuring a workable layout that does not require drastic design changes. More specifically, the poor control response of the clutch in a conventional transmission results from the long distance between the hydraulic control valve unit and the clutch. Therefore, one might consider the idea of placing all of the hydraulic control valves near the clutches. Implementing this idea, however, would require moving the entire hydraulic pressure control valve unit, including the valve body, from a bottom position of the transmission case (where it is typically arranged) to a position beside the clutches. Such a rearrangement would require a major design change and a workable layout may not be attainable if there is not extra space in a side portion of the transmission case or if adjacent members interfere with each other.

The first embodiment focuses particularly on the hydraulic pressure control valves that are used to control the clutch mechanism provided in an input section of the transmission, where good control response is required. More specifically, only the clutch control valves 70, 71 and 72 that control the two clutches CA and CB provided in the input section of the transmission are selected to be arranged near the clutches CA and CB. Additionally, the shortest clutch oil passages 77 and 78 that are structurally possible are used to connect the clutch control valves to the clutches.

In short, by selectively arranging a portion of the hydraulic pressure control valves, i.e., the clutch control valves 70, 71 and 72, in positions near the clutches CA and CB, a workable layout can be secured without the need for a major design change.

Additionally, arranging the selected clutch control valves 70, 71 and 72 in positions near the clutches CA and CB, the lengths of the clutch oil passages 77 and 78 that join the clutch control valves to the clutches can be shortened. Consequently, the control hydraulic pressures produced by the clutch control valves 70, 71 and 72 can be supplied to the clutches CA and CB with good response and the control hydraulic pressures supplied to the clutches CA and CB can be removed with good response by the clutch control valves 70, 71 and 72.

As a result, the control response of the clutches CA and CB can be improved while also securing a workable layout that does not require drastic design changes. Furthermore, the engagement states of the clutches CA and CB can be reversed with good response and gear shifting control that accurately tracks the driver's operation of the accelerator or the like can be accomplished.

In the twin-clutch automatic manual transmission in accordance with the first embodiment, the clutch control valves 70, 71 and 72 are arranged beside the clutches CA and CB provided in the input section of the transmission in a position at least the same height as the clutches CA and CB.

If the hydraulic pressure control valve unit controlling the holding pressure of the clutches were arranged in a position lower than the position of the clutches, as it is in conventional transmissions, then it would be easier for air to enter into the clutch oil passages. Air in the clutch oil passages would inhibit the ability to increase the pressure and further degrade the control response of the clutches.

Furthermore, if the control valves were positioned lower than the clutches, oil from the oil chambers of the clutches could leak downward toward the valves when the valves are set such that the clutches are released. As a result, extra time would be required for the oil to fill the oil chambers of the clutches before the pressure could be increased, thus further degrading the control response of the clutches.

In contrast, with the first embodiment, the clutch control valves 70, 71 and 72 are arranged in positions at least as high as the clutches CA and CB. Consequently, degradation of the control response of the clutches CA and CB resulting from air in the oil passages or oil leakage from the clutch oil chambers can be prevented in a reliable manner.

In the twin-clutch automatic manual transmission in accordance with the first embodiment, the valve body of the hydraulic pressure control valves is divided into the first valve body 81 housing the clutch control valves 70, 71 and 72, and the second valve body 82 housing the actuator hydraulic pressure control valve 59 that controls the gear ratio of the gear-speed changing mechanism. The clutch control valves 70, 71 and 72 and the first valve body 81 constitute the first control valve unit 45, and the actuator hydraulic pressure control valve 59 and the second valve body 82 constitute the second control valve unit 46. The first control valve unit 45 and the second control valve unit 46 are arranged in different positions of the transmission case 1.

If the hydraulic pressure control valves were divided and assembled into the inside of the transmission case, the amount of work required to manufacture the transmission would increase because valve assembly work would be required in two different positions of the transmission case. Furthermore, it would be difficult to achieve the valve assembly precision required to ensure that valves, etc., operate smoothly.

In contrast, in the first embodiment, the valves are divided into two units, i.e., the first control valve unit 45 and the second control valve unit 46. Consequently, the clutch control valves 70, 71 and 72 can be installed into the first valve body 81 as a subassembly and the actuator hydraulic pressure control valve 59 can be installed into the second valve body 82 as a subassembly. Then, the resulting first control valve unit 45 and second control valve unit 46 can be installed into the transmission case 1. As a result, the amount of valve assembly work can be reduced and a sufficiently high valve assembly precision can be achieved to ensure smooth operation of the valves.

In the twin-clutch automatic manual transmission in accordance with the first embodiment, the transmission case 1 is divided into the clutch case section 1*d* that houses the oil pump 4 and both of the clutches CA and CB provided in the input section of the transmission, and the first and second gear-speed changing mechanism case sections 1*e* and 1*f* that house the gear train. The first control valve unit 45 is arranged in a side position of the clutch case section 1*d* and the second control valve unit 46 is arranged in a bottom position of both gear change mechanism case sections 1*e* and 1*f*.

If the divided first and second control valve units were both arranged in the clutch case section of the transmission case, the control response of the clutches might improve but the shift control response of the gear-speed changing mechanism would decline because the second control valve unit would be arranged in a position distant from the gear-speed changing mechanism. Conversely, if the divided first and second control valve units were both arranged in the gear-speed changing mechanism case section of the transmission case, the shift control response of the gear-speed changing mechanism might improve but the control response of the clutches would decline because the first control valve unit would be arranged in a position distant from the clutches.

In the first embodiment, as described previously, the first control valve unit 45 and the second control valve unit 46 are divided such that the first control valve unit 45 is arranged in a side position of the clutch case section 1*d* and the second control valve unit 46 is arranged in a bottom position of both gear-speed changing mechanism case sections 1*e* and 1*f*. Consequently, the first control valve unit 45 is positioned close to the clutches CA and CB and the second control valve unit 46 is positioned close to the gear-speed changing mechanism. As a result, the control response of the clutches and the shift control response of the gear-speed changing mechanism can both be improved.

In the first embodiment, the automatic transmission is a twin-clutch automatic manual transmission and the clutch mechanism comprises the first clutch CA that is connected when a gear from a group of odd numbered speed gears is selected, and the second clutch CB that is connected when a gear from a group of even numbered speed gears is selected. Additionally, the gear-speed changing mechanism is a normally-meshed gear train having a synchromesh mechanism and configured to achieve a plurality of gear ratios with a plurality of pairs of gears having different tooth count ratios. When the transmission shifts from one gear to an adjacent gear, the clutch control valves 70, 71 and 72 are controlled so as to produce hydraulic pressures that cause the engagement states of the first clutch CA and the second clutch CB to be reversed. Meanwhile, before the clutch engagement states are reversed, the next gear is selected from the group of speed gears whose clutch is released and the actuator hydraulic pressure control valve 59 is operated so as to produce a gear changing hydraulic pressure at the shift actuator 50, 52, 53, or 54 corresponding to the selected gear, thereby moving the corresponding shift fork 41, 42, 43 and 44 in such a direction as to obtain the selected gear.

Among the various types of automatic transmissions, the twin-clutch automatic manual transmission has a unique gear changing mode in which the gear to be shifted to is selected in advance and then, afterwards, the gear change is completed by executing engagement state reversal control of the first clutch CA and the second clutch CB. More specifically, in a typical step-shifting automatic transmission, different clutch and brake engagement state reversal controls are executed for each gear shifting pattern. Conversely, in a twin-clutch automatic manual transmission, the engagement state reversal control of the first clutch CA and the second clutch CB is executed for all gear shifting patterns and the clutch engagement state reversal control greatly affects the quality of the gear shifting operations. Thus, in a twin-clutch automatic manual transmission, the control responses of the first clutch CA and the second clutch CB must be good in order to achieve a high-quality gear shifting control that changes the gears without the occurrence of shock or pausing during all gear shifting patterns.

The first embodiment adopts a configuration in which the clutch control valves 70, 71 and 72 are arranged close to the first clutch CA and second clutch CB in a twin-clutch automatic manual transmission having the first clutch CA and second clutch CB in an input section of the transmission. As a result, the control responses of the first clutch CA and the second clutch CB are improved and a high-quality gear shifting control that changes the gears without the occurrence of shock or pausing can be achieved during all gear shifting patterns.

The effects of the transmission will now be explained. The effects listed below can be obtained with a twin-clutch automatic manual transmission in accordance with the first embodiment.

(1) The twin-clutch automatic manual transmission in accordance with the first embodiment is equipped with hydraulic pressure control valves that are arranged inside a transmission case 1 and configured to produce a control hydraulic pressure for controlling a gear changing element configured to operate hydraulically when the transmission changes gears. Among the hydraulic pressure control valves, the clutch control valves 70, 71 and 72 that serve to control the two clutches CA and CB provided in the input section of the transmission are selected to be arranged near the clutches CA and CB. As a result, the control responses of the clutches CA and CB can be improved while ensuring a workable layout that does not require drastic design changes.

(2) The clutch control valves 70, 71 and 72 are arranged beside the clutches CA and CB (which are provided in the input section of the transmission) in positions at least as high as the clutches CA and CB. As a result, degradation of the control response of the clutches CA and CB resulting from air in the oil passages or oil leakage from the clutch oil chambers can be prevented in a reliable manner.

(3) The valve body of the hydraulic pressure control valves is divided into the first valve body 81 that housing the clutch control valves 70, 71 and 72 and the second valve body 82 that housing the actuator hydraulic pressure control valve 59 that controls the gear ratio of the gear-speed changing mechanism. The clutch control valves 70, 71 and 72 and the first valve body 81 constitute the first control valve unit 45, and the actuator hydraulic pressure control valve 59 and the second valve body 82 constitute the second control valve unit 46. The first control valve unit 45 and the second control valve unit 46 are arranged in different positions of the transmission case 1. Consequently, the clutch control valves 70, 71 and 72 can be installed into the first valve body 81 as a subassembly and the actuator hydraulic pressure control valve 59 can be installed into the second valve body 82 as a subassembly. Then, the resulting first control valve unit 45 and second control valve unit 46 can be installed into the transmission case 1. As a result, the amount of valve assembly work can be reduced and a sufficiently high valve assembly precision can be achieved to ensure smooth operation of the valves.

The transmission case 1 is divided into the clutch case section 1d that houses the oil pump 4 and both of the clutches CA and CB provided in the input section of the transmission, and the first and second gear-speed changing mechanism case sections 1e and 1f that house the gear train. The first control valve unit 45 is arranged in a side position of the clutch case section 1d and the second control valve unit 46 is arranged in a bottom position of both gear change mechanism case sections 1e and 1f. Consequently, the first control valve unit 45 is positioned close to the clutches CA and CB and the second control valve unit 46 is positioned close to the gear-speed changing mechanism. As a result, the control response of the clutches and the shift control response of the gear-speed changing mechanism can both be improved.

(5) The automatic transmission is a twin-clutch automatic manual transmission and the clutch mechanism comprises the first clutch CA that is connected when a gear from a group of odd numbered speed gears is selected and a second clutch CB that is connected when a gear from a group of even numbered speed gears is selected. Additionally, the gear-speed changing mechanism is a normally-meshed gear train having a synchromesh mechanism and configured to achieve a plurality of gear ratios with a plurality of pairs of gears having different tooth count ratios. When the transmission shifts from one gear to an adjacent gear, the clutch control valves 70, 71 and 72 are controlled so as to produce hydraulic pressures that cause the engagement states of the first clutch CA and the second clutch CB to be reversed. Meanwhile, before the clutch engagement states are reversed, the next gear is selected from the group of speed gears whose clutch is released and the actuator hydraulic pressure control valve 59 is operated so as to produce a gear changing hydraulic pressure at the shift actuator 50, 52, 53 or 54 corresponding to the selected gear, thereby moving the corresponding shift fork 41, 42, 43 and 44 in such a direction as to obtain the selected gear. As a result, the control responses of the first clutch CA and the second clutch CB are improved and a high-quality gear shifting control that changes the gears without the occurrence of shock or pausing can be achieved during all gear shifting patterns.

Figure 3:
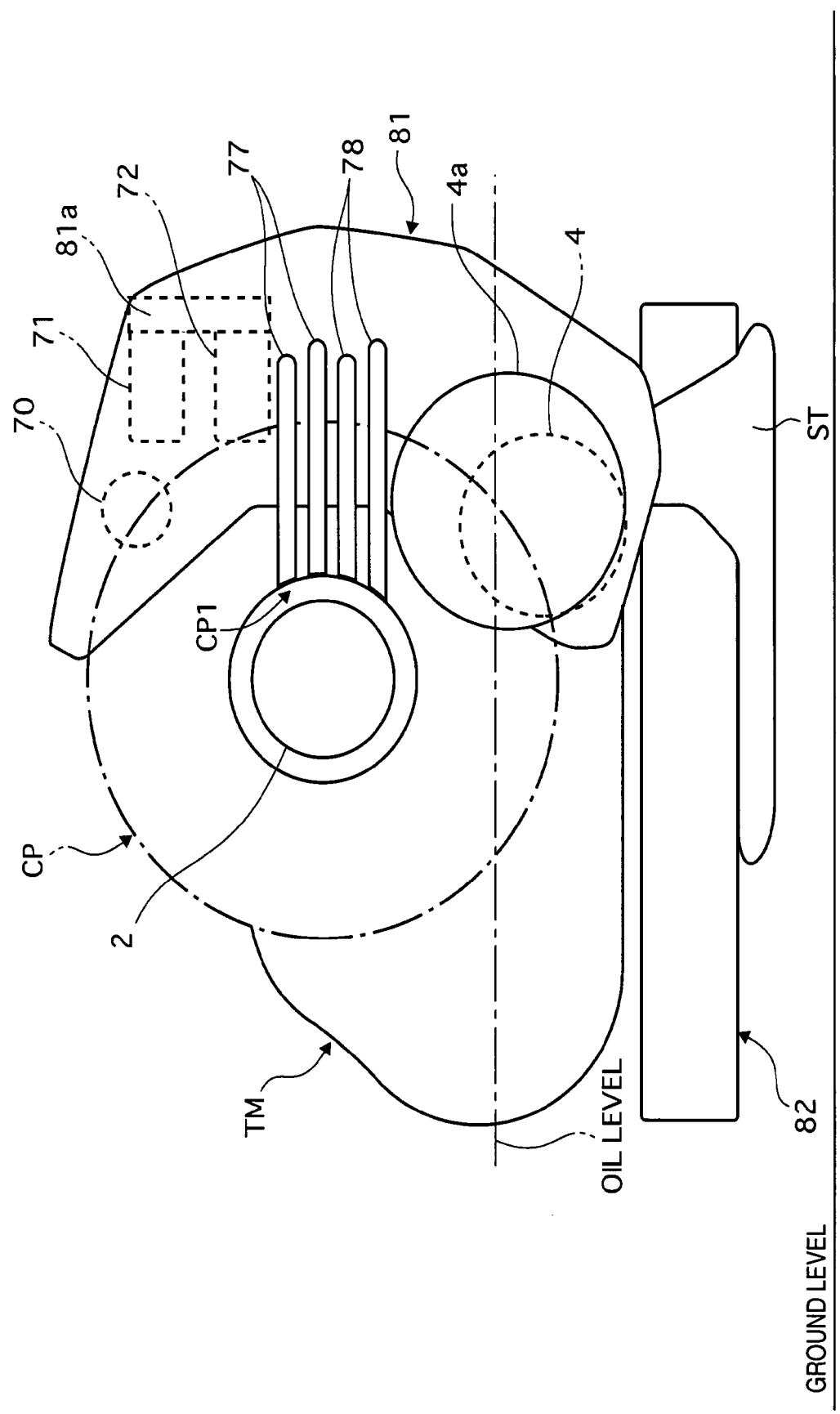
FIG. 3 is a simplified axial end elevational view of the twin-clutch automatic manual transmission showing the positional relationships of the constituent components in accordance with the first embodiment of the present invention.
Figure 4:
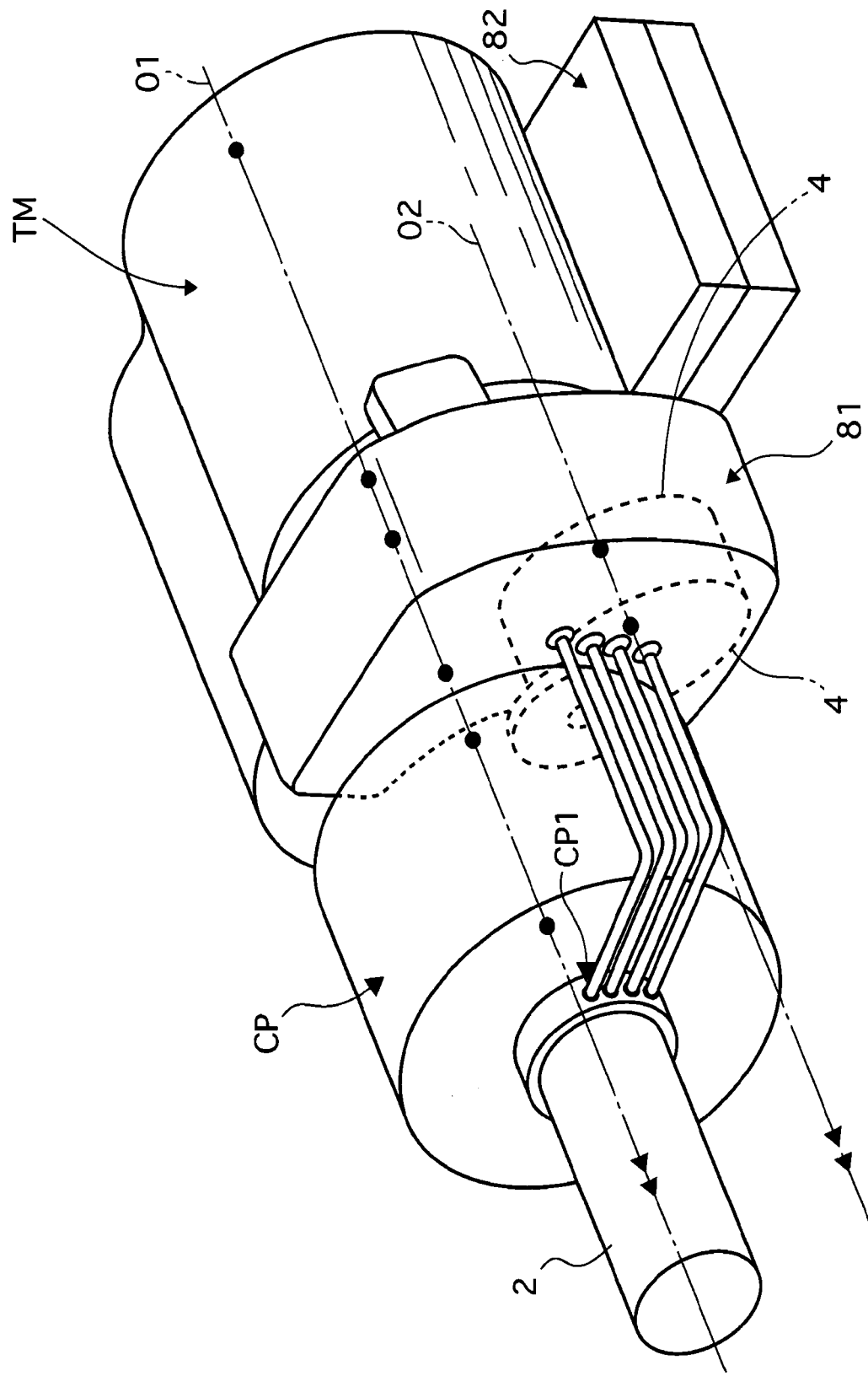
FIG. 4 is a simplified perspective view of the twin-clutch automatic manual transmission showing the positional relationships of the constituent components in accordance with the first embodiment of the present invention.
Figure 5:
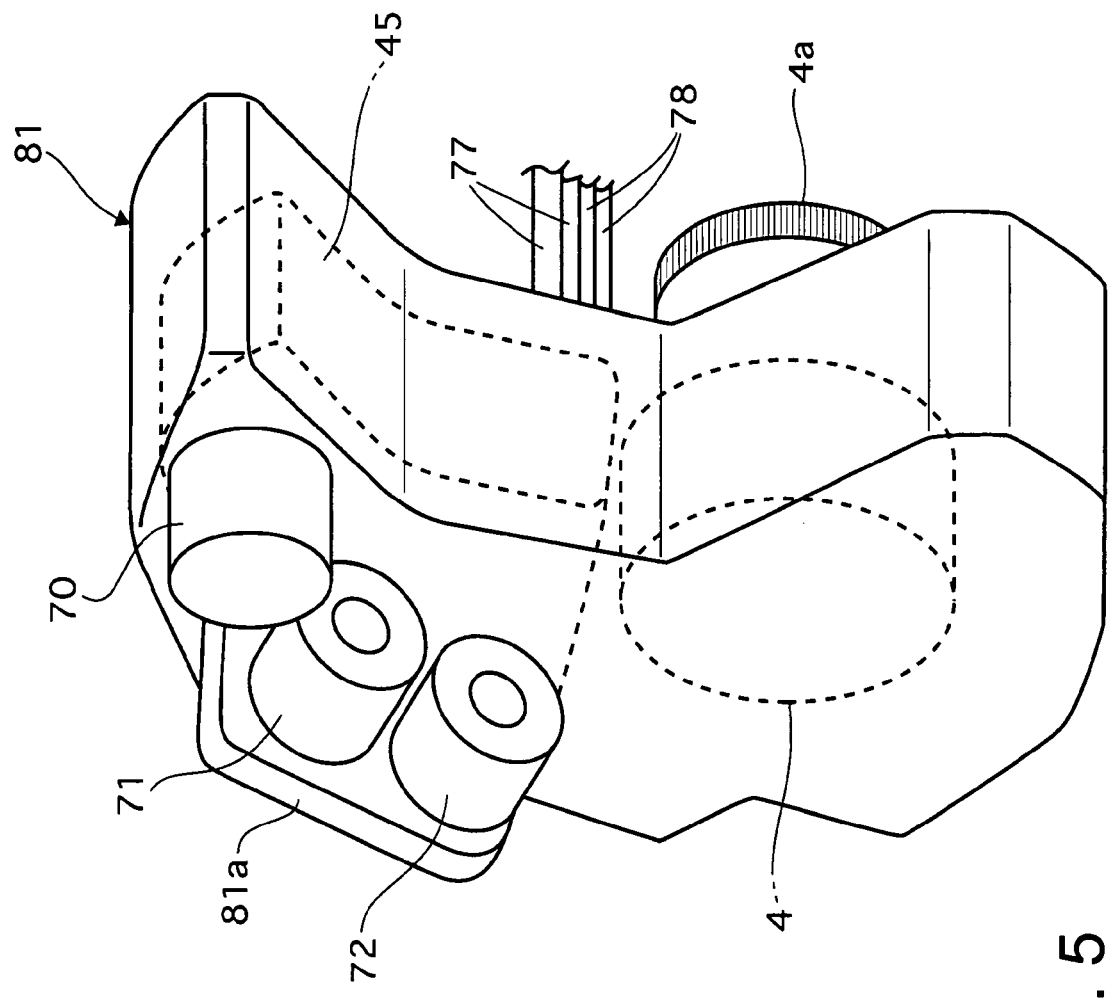
FIG. 5 is a simplified perspective view of the first valve body of the twin-clutch automatic manual transmission in accordance with the first embodiment of the present invention.

The overall construction and constituent component layout of the twin-clutch automatic manual transmission will now be explained. FIG. 3 is a frontal schematic view showing the positional relationships of the constituent components of the twin-clutch automatic manual transmission; FIG. 4 is a schematic perspective view showing the positional relationships of the constituent components of the same; and FIG. 5 is a schematic perspective view of the first valve body 81. For the purposes of explanation, the constituent components described heretofore are handled collectively as the constituent components described below.

As shown in FIG. 3, the twin-clutch automatic manual transmission comprises the clutch pack CP having the first clutch CA and the second clutch CB as constituent components, the first valve body 81 in which is housed the first control valve unit 45 configured to produce control hydraulic pressures to be supplied to the first clutch CA and the second clutch CB, the gear-speed changing mechanism TM configured to produce gear ratios ranging from a first to a sixth speed and including a reverse gear, and the second valve body 82 in which is housed the second control valve unit 46 to produce control hydraulic pressures to be supplied shift actuators 50, 52, 53 and 54 corresponding to the respective gears.

As shown in schematic frontal view of FIG. 3, the first valve body 81 has substantially the shape of a crescent moon in a frontal view along the axial direction. As shown in the perspective views of FIGS. 4 and 5, the first valve body 81 has a generally plate-like shape when viewed from a direction perpendicular to the axial direction. As shown in FIG. 4, the first valve body 81 is arranged between the clutch pack and the gear-speed changing mechanism TM and is configured to cover the outside circumferences of the first transmission input shaft 5 and the second transmission input shaft 6.

As shown in FIG. 4, the first valve body 81 is arranged axially adjacent to the clutch pack CP and mates against the frontward end wall 1a of the transmission case 1 with a surface that is substantially perpendicular to a level ground surface. The first valve body 81 is arranged in a generally vertical orientation. The clutch pack CP, the first valve body 81, and the gear-speed changing mechanism TM are arranged in series along the axial direction such that the clutch pack CP is the closest to the engine E, the first valve body 81 is the next closest to the engine E, and the gear-speed changing mechanism TM is the farthest from the engine E. In other words, the first valve body 81 is arranged between the clutch pack CP and the gear-speed changing mechanism TM.

As shown in FIG. 4, the clutch pack CP, the first valve body 81, and the gear-speed changing mechanism TM are arranged along the same axially oriented axis $O_1$ such that the clutch pack CP is the closest to the engine E, the first valve body 81 is the next closest to the engine E, and the gear-speed changing mechanism TM is the farthest from the engine E. Additionally, the oil pump 4 is arranged on a second axis $O_2$ that is parallel to the aforementioned axis $O_1$ such that the oil pump 4 overlaps the first valve body 81 when viewed along a direction perpendicular to the axial direction. In FIG. 4, the black dots on the axes $O_1$ and $O_2$ indicate the positions where the axes pass through the constituent components.

As shown in the schematic perspective view of FIG. 5, the first control valve unit 45 and the oil pump 4 are housed inside the first valve body 81 as a unit.

The first control valve unit 45 is arranged in an upper position inside the first valve body 81. Thus, the line pressure solenoid valve 70, the first clutch pressure solenoid valve 71 (clutch control valve), and the second clutch pressure solenoid valve 72 (clutch control valve) are installed in an upper portion of the first valve body 81. The first and second clutch pressure solenoid valves 71 and 72 are mounted to a valve support 81a so as to be arranged above and below each other. The valve support 81a is formed so as to protrude from a side face of the valve body 81.

The oil pump 4 is arranged in a lower position inside the first valve body 81. The oil pump 4 is provided with an oil pump driven gear 4a that meshes with an oil pump driven gear 2a provided coaxially on the drive input shaft 2. Thus, the rotational axis of the oil pump driven gear 4a that serves to drive the oil pump 4 different from the rotational axis of the drive input shaft 2. In other words, as shown in FIGS. 4 and 5, the oil pump 4 is arranged so as to be offset from the first and second transmission intake shafts 5 and 6 and to overlap the first valve body 81 when viewed along a direction perpendicular to the axial direction.

As indicated by the oil level line in FIG. 3, the oil pump 4 is normally immersed in hydraulic oil, at least when the vehicle is stopped. A strainer ST having an intake hole for drawing in hydraulic oil is connected to the oil pump 4 and arranged below the oil pump 4. The oil pump 4 and strainer ST are configured such that hydraulic oil can be drawn into the oil pump 4 in a reliable fashion even when the surface of the oil is slanted due to cornering, acceleration, or deceleration.

The first clutch oil passage 77 and the second clutch oil passage 78 are provided on the side of the first valve body 81 that faces the clutch pack CP. The first clutch oil passage 77 and the second clutch oil passage 78 serve to supply control hydraulic pressure that has been adjusted by the first clutch pressure solenoid valve 71 and the second clutch pressure solenoid valve 72 to the clutch oil chambers inside the clutch pack CP. The first and second clutch oil passages 77 and 78 are provided between the first and second clutch pressure solenoid valves 71 and 72 and the oil pump 4. As shown in FIG. 3, there are two first clutch oil passages 77 and two second clutch oil passages 78; one is for supplying hydraulic oil and the other is for discharging hydraulic oil.

The first and second clutch oil passages 77 and 78 are connected to oil inlet/outlet holes CP1 that are provided near the center axis of the clutch pack CP and open into the clutch oil chambers. The hydraulic oil pressure produced inside the first valve body 81 is supplied to the clutch oil chambers through the oil inlet/outlet holes CP1. As shown in FIG. 3, the oil inlet/outlet holes CP1 are arranged such that the first clutch pressure solenoid valve 71 and second clutch pressure solenoid valve 72 are positioned at the same height as or higher than the oil inlet/outlet holes CP1.

As shown in FIG. 1, the transmission case 1 that houses the gear-speed changing mechanism TM, the clutch pack CP, and the oil pump 4 comprises the clutch case section 1*d* that encloses the clutch pack CP and the oil pump and a first gear change mechanism case section 1*e* that encloses the gear change mechanism TM. Furthermore, as shown in FIG. 1, the first valve body 81 is arranged in a side position of the clutch case section 1*d* and the second valve body 82 is arranged in a bottom position of the gear change mechanism case section 1*e*. In other words, the oil pump 4 is arranged so as to be offset from the first and second transmission input shafts 5 and 6 in a direction toward where the second valve body 82 is arranged.

The operational effects obtained with a transmission configured just described will now be explained.

The first valve body 81 and the clutch pack CP are arranged axially adjacent to each other and the oil pump 4 is offset from the first and second transmission input shafts 5 and 6 and arranged so as to overlap with the first valve body 81 when viewed from a direction perpendicular to the axial direction. In other words, in order to improve the control response of the first clutch CA and the second clutch CB, it is preferable to arrange the first valve body 81, i.e., the first and second clutch pressure solenoid valves 71 and 72, in a position close to the clutch pack CP. Therefore, by arranging the oil pump 4 so as to be offset from the first and second transmission input shafts 5 and 6 and to overlap the first valve body 81 when viewed from a direction perpendicular to the axial direction, the first valve body 81 can be arranged at the position of the oil pump 4 and the axial dimension of the automatic transmission can be suppressed while also preventing the automatic transmission from being large in a direction perpendicular to the axial direction.

The clutch pack CP, the first valve body 81, and the gear-speed changing mechanism TM are arranged in series along the axial direction such that the clutch pack CP is the closest to the engine E, the first valve body 81 is the next closest to the engine E, and the gear-speed changing mechanism TM is the farthest from the engine E. Thus, the distance from the first valve body 81, i.e., the first and second clutch pressure solenoid valves 71 and 72, to the first and second clutches CA and CB and the distance from the first valve body 81 to the gear-speed changing mechanism TM can be both be shortened. As a result, the control response of the first and second clutches CA and CB can be increased and the control response of the gear-speed changing mechanism can be increased.

The first valve body 81 is arranged between the clutch pack CP and the gear-speed changing mechanism TM. Thus, the distance from the first valve body 81, i.e., the first and second clutch pressure solenoid valves 71 and 72, to the first and second clutches CA and CB and the distance from the first valve body 81 to the gear-speed changing mechanism TM can be both be shortened. As a result, the control response of the first and second clutches CA and CB can be increased and the control response of the gear-speed changing mechanism can be increased.

The clutch pack CP, the first valve body 81, and the gear-speed changing mechanism TM are arranged along the same axially oriented axis 01 such that the clutch pack CP is the closest to the engine E, the first valve body 81 is the next closest to the engine E, and the gear-speed changing mechanism TM is the farthest from the engine E. Additionally, the oil pump 4 is arranged on a second axis 02 that is parallel to the aforementioned axis 01 such that the oil pump 4 overlaps the first valve body 81 when viewed along a direction perpendicular to the axial direction. Thus, the distance from the first valve body 81, i.e., the first and second clutch pressure solenoid valves 71 and 72, to the first and second clutches CA and CB and the distance from the first valve body 81 to the gear-speed changing mechanism TM can be both be shortened. As a result, the control response of the first and second clutches CA and CB can be increased and the control response of the gear-speed changing mechanism can be increased.

The transmission case 1 that houses the gear-speed changing mechanism TM, the clutch pack CP, and the oil pump 4 comprises a clutch case section 1*d* that encloses the clutch pack CP and the oil pump and a first gear change mechanism case section 1*e* that encloses the gear change mechanism TM. The valve body comprises a first valve body 81 that encloses the first and second clutch pressure solenoid valves and a second valve body 82 that encloses the actuator hydraulic pressure control valves (shift control valves) serving to produce hydraulic pressures for controlling the shift actuators 50, 52, 53 and 54 (gear changing elements). The first valve body 81 is arranged in a side position of the clutch case section 1*d* and the second valve body 82 is arranged in a bottom position of the gear change mechanism case section 1*e*.

Consequently, the first control valve unit 45 is positioned close to the clutches CA and CB and the second control valve unit 46 is positioned close to the gear-speed changing mechanism TM. As a result, the control response of the clutches and the shift control response of the gear change mechanism can both be improved.

The oil pump 4 is arranged such that it overlaps with the first valve body 81 when viewed in a direction perpendicular to the axial direction. Thus, there is a large degree of freedom with respect to the position of the valve body in the direction perpendicular to the axial direction because the position of the valve body is not limited to the position of the input shafts. Meanwhile, the position of the clutches in the direction perpendicular to the axial direction is limited because the clutches need to be arranged coaxially with respect to the input shafts. Therefore, by arranging the valve body and the oil pump such that they overlap in a direction perpendicular to the axial direction, the distance from the first and second transmission input shafts 5 and 6 to the oil pump 4 and the first valve body 81 in the direction perpendicular to the axial direction can be shortened and the radial dimension of the automatic transmission can be shortened.

The oil pump 4 and the valve body 81 are arranged as a single unit. As a result, the length of the oil passage between the oil pump 4 and the first control valve 45 can be shortened even further and the number of parts can be reduced.

The oil pump 4 is arranged in a lower position inside the first valve body 81. Thus, the oil pump 4 is immersed in oil even when it is not being driven. As a result, a pump priming effect can be obtained and the response with which the oil pump 4 can generate hydraulic pressure when it starts being driven can be improved.

The first and second clutch pressure solenoid valves 71 and 72 are arranged in positions at least as high as the oil inlet/outlet holes CP1 provided in the oil pressure chambers of the clutches. As a result, degradation of the control response of the clutches CA and CB resulting from air in the oil passages or oil leakage from the clutch oil chambers can be prevented in a reliable manner.

Although an automatic transmission in accordance with the present invention is explained herein based on a first embodiment, the specific constituent features of the invention are not limited to those of the first embodiment. Various design modifications and additional features can be permitted so long as such changes do not depart from the scope of the invention as defined in the appended claims.

In the first embodiment, the clutch control valves 70, 71 and 72 and the first valve body 81 constitute the first control valve unit 45. The actuator hydraulic pressure control valve 59 and the second valve body 82 constitute the second control valve unit 46. Additionally, the first control valve unit 45 is arranged in a side position of the clutch case section 1d and the second control valve unit 46 is arranged in a bottom position of both gear change mechanism case sections 1e and 1f. However, when the automatic clutch is a step-shifting automatic transmission or a continuously variable automatic transmission, it is acceptable to arrange the clutch control valve close to the clutch and arrange the shift control valve close to the gear-speed changing mechanism in accordance with the positions of the hydraulically operated gear changing elements that serve to change the gears. In short, the arrangement (positional relationships) of the control valves is not limited to the arrangement presented in the first embodiment. In other words, the present invention includes any transmission configuration in which a control valve serving to control a clutch provided in an input section of the transmission is selected from among a plurality of hydraulic pressure control valves to be arranged near the clutch.

In the first embodiment, the automatic transmission is a twin-clutch automatic manual transmission provided with the first clutch CA that is connected when a gear from a group of odd numbered speed gears is selected and the second clutch CB that is connected when a gear from a group of even numbered speed gears is selected. However, the present invention can be applied to other types of automatic transmissions, e.g., step-shifting automatic transmissions in which the gear-speed changing mechanism is divided into a main gear-speed changing mechanism and an auxiliary gear-speed changing mechanism, belt-type continuously variable transmissions and toroidal (continuously variable) transmissions divided into a forward/reverse switching mechanism and a continuously variable gear-speed changing mechanism, and automatic transmissions equipped with a torque converter having a lockup clutch. In short, the present invention can be applied to any automatic transmission having a hydraulic pressure control valve that is arranged in the transmission case and configured to produce a hydraulic pressure for controlling a clutch.

In the first embodiment, the oil pump 4 and the first valve body 81 are arranged so as to overlap each other in a direction perpendicular to the axial direction. However, it is also acceptable to arrange the oil pump 4 to overlap with the clutch pack CP in a direction perpendicular to the axial direction or to arrange the oil pump 4, the clutch pack CP, and the first valve body 81 such that all three overlap one another in a direction perpendicular to the axial direction. As a result, the axial dimension can be prevented from becoming larger. Additionally, since the valve body is generally plate-shaped, the outer dimension in a radial direction would increase markedly at the portions other than the positions where the plate-shaped valve body contacts the cylindrical external shape of the clutch pack CP if the valve body were arranged around the outside of the clutch pack CP. By arranging the oil pump 4 in a radially outward position, the increase in the outer radial dimension just described (i.e., the increase in radial dimension at portions other than the contact points) can be eliminated and the increase in the size of the transmission in the direction perpendicular to the axial direction can be suppressed.

In the first embodiment, the valve body is divided into the first valve body 81 and the second valve body 82. However, it is also acceptable to have a single undivided valve body arranged adjacent to the clutch pack CP. This is true because the overall desired response characteristic can be secured by arranging the valve body near the constituent component that requires a fast response. Additionally, since the purpose of the valve body is to enclose the oil passages and control valves, there are no particular limitations regarding the shape of the valve body. Thus, all of the valve bodies can be concentrated in one location in order to effectively utilize the space around the outer perimeter of the first and second transmission input shafts 5 and 6.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. Moreover, terms that are expressed as "means-plus function" in the claims should include any structure that can be utilized to carry out the function of that part of the present invention.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An automatic transmission comprising:
   an input shaft configured and arranged to receive a rotational drive torque from a drive source;
   a gear-speed changing mechanism configured to produce a gear ratio and operatively arranged to receive the rotational torque from the drive source;
   a clutch mechanism arranged coaxially with respect to the input shaft and configured to be hydraulically connected and disconnected to the rotational drive torque from the drive source to the gear-speed changing mechanism;
   a clutch hydraulic pressure control mechanism configured to control hydraulic pressure of the clutch mechanism;
   a valve body arranged axially adjacent to the clutch mechanism and enclosing the clutch hydraulic pressure control mechanism; and
   an oil pump configured and arranged to supply hydraulic pressure to the clutch hydraulic pressure control mechanism, the oil pump being further arranged so as to be offset from the input shaft and to overlap at least one of the clutch mechanism and the valve body when viewed along a direction perpendicular to an axial direction of the input shaft.

2. The automatic transmission as recited in claim 1, wherein
   the clutch mechanism, the valve body and the gear-speed changing mechanism are arranged in series along the axial direction of the input shaft such that the clutch mechanism is the closest to the drive source, the valve body is next closest to the drive source, and the gear-speed changing mechanism is farthest from the drive source.

3. The automatic transmission as recited in claim 2, further comprising
   a transmission case including a clutch case section enclosing the clutch mechanism and the oil pump and a gear-speed changing mechanism case section enclosing the gear-speed changing mechanism; and
   the valve body including a first valve body enclosing the clutch hydraulic pressure control mechanism and a second valve body enclosing a shift control valve that produce hydraulic pressure for controlling a gear changing element of the gear-speed changing mechanism, with the first valve body being arranged in a side position of the clutch case section and the second valve body being arranged in a bottom position of the gear-speed changing mechanism case section.

4. The automatic transmission as recited in claim 2, wherein
   the oil pump overlaps the valve body when viewed along the direction perpendicular to the axial direction of the input shaft.

5. The automatic transmission as recited in claim 4, wherein
   the oil pump and the valve body are arranged as a single unit.

6. The automatic transmission as recited in claim 2, wherein
   the oil pump is arranged below the valve body or the clutch mechanism.

7. The automatic transmission as recited in claim 2, wherein
   the clutch mechanism comprises a first clutch configured and arranged to be connected when any one of a group of odd numbered speed gears is selected and a second clutch configured and arranged to be connected when a speed gear from a group of even numbered speed gears is selected;
   the gear-speed changing mechanism comprises a normally-meshed gear train having a synchromesh mechanism and is configured to achieve a plurality of gear ratios with a plurality of pairs of gearwheels having different tooth count ratios;
   the clutch hydraulic pressure control mechanism includes a plurality of clutch control valves that are configured to produce hydraulic pressure required to control engagement states of the first clutch and the second clutch when the transmission is shifted from one speed gear to an adjacent speed gear; and
   the oil pump is configured and arranged to supply hydraulic pressure to a shift control valve to produce an operating hydraulic pressure for a shift actuator that is configured to operate in advance of an engagement state reversal control of the first and second clutches so as to select a next speed gear from one of the speed gear groups that is disconnected and move a shift fork in such a direction that the next speed gear can be achieved.

8. The automatic transmission as recited in claim 1, wherein
   the valve body is arranged between the clutch mechanism and the gear-speed changing mechanism.

9. The automatic transmission as recited in claim 1, wherein
   the clutch hydraulic pressure control mechanism is located at a position that is at least as high as an oil inlet hole of a hydraulic pressure chamber of the clutch mechanism.

10. An automatic transmission comprising:
    an input shaft configured and arranged to receive a rotational drive torque from a drive source;
    a gear-speed changing mechanism configured to produce a gear ratio and operatively arranged to receive the rotational torque from the drive source;
    a clutch mechanism arranged coaxially with respect to the input shaft and configured to be hydraulically connected and disconnected to the rotational drive torque from the drive source to the gear-speed changing mechanism;
    a clutch hydraulic pressure control mechanism configured to control hydraulic pressure of the clutch mechanism;
    a valve body enclosing the clutch hydraulic pressure control mechanism, with the clutch mechanism, the valve body and the gear-speed changing mechanism being arranged along a first axis that is parallel to the axial direction of the input shaft such that the clutch mechanism is closest to the drive source, the valve body is next closest to the drive source, and the gear-speed changing mechanism is farthest from the drive source; and an oil pump configured and arranged to supply hydraulic pressure to the clutch hydraulic pressure control mechanism, the oil pump being further arranged on a second axis that is parallel to the first axis such that the oil pump overlaps at least one of the clutch mechanism and the valve body when viewed along a direction perpendicular to the first and second axes.

11. The automatic transmission as recited in claim 10, further comprising a transmission case including a clutch case section enclosing the clutch mechanism and the oil pump and a gear-speed changing mechanism case section enclosing the gear-speed changing mechanism; and the valve body including a first valve body enclosing the clutch hydraulic pressure control mechanism and a second valve body enclosing a shift control valve that produce hydraulic pressure for controlling a gear changing element of the gear-speed changing mechanism, with the first valve body being arranged in a side position of the clutch case section and the second valve body being arranged in a bottom position of the gear-speed changing mechanism case section.

12. The automatic transmission as recited in claim 10, wherein the oil pump overlaps the valve body when viewed along the direction perpendicular to the axial direction of the input shaft.

13. The automatic transmission as recited in claim 12, wherein the oil pump and the valve body are arranged as a single unit.

14. The automatic transmission as recited in claim 10, wherein the oil pump is arranged below the valve body or the clutch mechanism.

15. The automatic transmission as recited in claim 10, wherein the clutch mechanism comprises a first clutch configured and arranged to be connected when any one of a group of odd numbered speed gears is selected and a second clutch configured and arranged to be connected when a speed gear from a group of even numbered speed gears is selected;

the gear-speed changing mechanism comprises a normally-meshed gear train having a synchromesh mechanism and is configured to achieve a plurality of gear ratios with a plurality of pairs of gearwheels having different tooth count ratios;

the clutch hydraulic pressure control mechanism includes a plurality of clutch control valves that are configured to produce hydraulic pressure required to control engagement states of the first clutch and the second clutch when the transmission is shifted from one speed gear to an adjacent speed gear; and the oil pump is configured and arranged to supply hydraulic pressure to a shift control valve to produce an operating hydraulic pressure for a shift actuator that is configured to operate in advance of an engagement state reversal control of the first and second clutches so as to select a next speed gear from one of the speed gear groups that is disconnected and move a shift fork in such a direction that the next speed gear can be achieved.

16. The automatic transmission as recited in claim 10, wherein the clutch hydraulic pressure control mechanism is located at a position that is at least as high as an oil inlet hole of a hydraulic pressure chamber of the clutch mechanism.

17. An automatic transmission comprising:

input means for receiving a rotational drive torque from a drive source;

gear-speed changing means for producing a gear ratio and operatively arranged to receive the rotational torque from the drive source;

clutch means, arranged coaxially with respect to the input means, for hydraulically connecting and disconnecting to the rotational drive torque from the drive source to the gear-speed changing mechanism;

hydraulic pressure control means for controlling hydraulic pressure of the clutch mechanism;

valve body means, arranged axially adjacent to the clutch means, for enclosing hydraulic control means; and hydraulic pump means for supplying hydraulic pressure to the hydraulic pressure control means, with the hydraulic pump means being arranged so as to be offset from the input means and to overlap at least one of the clutch means and the valve body means when viewed along a direction perpendicular to an axial direction of the input means.

18. A method for constructing an automatic transmission comprising:

providing an input shaft for receiving a rotational drive torque from a drive source;

providing a gear-speed changing mechanism for producing a gear ratio and operatively arranged to the rotational torque from the drive source;

providing a clutch mechanism arranged coaxially with respect to the input shaft and configured to be hydraulically connected and disconnected to the rotational drive torque from the drive source to the gear-speed changing mechanism;

providing a clutch hydraulic pressure control mechanism configured to control hydraulic pressure of clutch mechanism;

providing a valve body being arranged axially adjacent to the clutch mechanism and enclosing the clutch hydraulic pressure control mechanism; and providing an oil pump configured and arranged to supply hydraulic pressure to the clutch hydraulic pressure control mechanism, the oil pump being arranged so as to be offset from the input shaft and to overlap at least one of the clutch mechanism and the valve body when viewed along a direction perpendicular to an axial direction of the input shaft.

* * * * *